United States Patent
Nakashima et al.

(10) Patent No.: US 12,281,808 B2
(45) Date of Patent: *Apr. 22, 2025

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Toyokazu Nakashima, Nagoya (JP); Takayuki Hatori, Nagakute (JP); Shuichi Sawada, Nagoya (JP); Daiki Kubo, Toyota (JP); Tomoki Ishikawa, Nagoya (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,122

(22) Filed: Nov. 29, 2023

(65) Prior Publication Data
US 2024/0093896 A1 Mar. 21, 2024

Related U.S. Application Data

(63) Continuation of application No. 17/474,526, filed on Sep. 14, 2021, now Pat. No. 11,892,183.

(30) Foreign Application Priority Data

Oct. 23, 2020 (JP) .................. 2020-178377

(51) Int. Cl.
*F24F 11/47* (2018.01)
*F24F 11/39* (2018.01)
(Continued)

(52) U.S. Cl.
CPC .............. *F24F 11/47* (2018.01); *F24F 11/39* (2018.01); *G05B 13/02* (2013.01); *F24F 2140/50* (2018.01); *F24F 2140/60* (2018.01)

(58) Field of Classification Search
CPC .. F24F 11/39; F24F 11/47; F24F 11/64; F24F 11/77; F24F 2110/65; F24F 2140/50; F24F 2140/60; G05B 13/02; Y02B 30/70
See application file for complete search history.

(56) References Cited

U.S. PATENT DOCUMENTS

2013/0110621 A1* 5/2013 Gupta ................... G01D 4/004
702/60
2015/0116107 A1* 4/2015 Fadell .................. G06Q 10/083
340/501

(Continued)

FOREIGN PATENT DOCUMENTS

JP 2016-224650 A 12/2016

OTHER PUBLICATIONS

Dec. 22, 2022 Office Action issued in U.S. Appl. No. 17/474,526.
(Continued)

*Primary Examiner* — Tameem D Siddiquee
(74) *Attorney, Agent, or Firm* — Oliff PLC (57) ABSTRACT

An information processing device has a control unit that acquires information relating to a fluctuation of power consumed by an electrical product operating around a user, and that estimates a product consumed by the user and a consumption quantity of the product based on the information relating to the fluctuation in the power.

6 Claims, 6 Drawing Sheets (51) Int. Cl.
*G05B 13/02* (2006.01)
*F24F 140/50* (2018.01)
*F24F 140/60* (2018.01)

(56) References Cited

U.S. PATENT DOCUMENTS

| | | | |
|---|---|---|---|
| 2015/0245668 A1 | 9/2015 | Memari et al. | |
| 2017/0030882 A1* | 2/2017 | Skoda | A61M 15/0003 |
| 2018/0262046 A1* | 9/2018 | Moon | G01R 11/04 |
| 2018/0349980 A1* | 12/2018 | Alvo | G06Q 30/0202 |
| 2021/0044690 A1* | 2/2021 | Fard | H04B 7/26 |

OTHER PUBLICATIONS

Jun. 13, 2023 Office Action issued in U.S. Appl. No. 17/474,526.
Oct. 2, 2023 Notice of Allowance issued in U.S. Appl. No. 17/474,526.

\* cited by examiner

| PRODUCT ID | PRE-CONSUMPTION INVENTORY QUANTITY | ORDER THRESHOLD | ORDER QUANTITY | CONSUMPTION COUNTER | POWER CONSUMPTION FLUCTUATION AMOUNT |
|---|---|---|---|---|---|
| ××× | ××× | ××× | ××× | ××× | ××× |
| ××× | ××× | ××× | ××× | ××× | ××× |
| ××× | ××× | ××× | ××× | ××× | ××× |
| ... | ... | ... | ... | ... | ... |

INFORMATION PROCESSING DEVICE, INFORMATION PROCESSING METHOD, AND SYSTEM

CROSS-REFERENCE TO RELATED APPLICATION

This application is a continuation of U.S. application Ser. No. 17/474,526, filed Sep. 14, 2021. This application claims priority to Japanese Patent Application No. 2020-178377 filed on Oct. 23, 2020, incorporated herein by reference in its entirety.

BACKGROUND

1. Technical Field

The present disclosure relates to an information processing device, an information processing method, and a system.

2. Description of Related Art

A technique for supporting periodical purchase of goods, such as daily necessities, is known. For example, Japanese Unexamined Patent Application Publication No. 2016-224650 (JP 2016-224650 A) discloses a system that executes a process of ordering a product related to a beacon device, in which the system is triggered by pressing an order button provided for the beacon device. Installation of the beacon device described in JP 2016-224650 A in the vicinity of a place where products are stored, such as a refrigerator or a washroom, makes it possible to order products with a simple operation.

SUMMARY

On the other hand, in the prior art, there is room for improvement in that a user has to manage the inventory of the products and place an order by the user. An object of the present disclosure is to estimate a consumption quantity of the product.

An aspect of the present disclosure is an information processing device including a control unit that executes: acquiring information relating to a fluctuation of power consumed in an electrical product operated around a user; and estimating a product consumed by the user and a consumption quantity of the product based on the information relating to the fluctuation of the power.

An aspect of the present disclosure is an information processing method, in which the computer executes: acquiring information relating to a fluctuation of power consumed by an electrical product operated around a user; and estimating a product consumed by the user and a consumption quantity of the product based on the information relating to the fluctuation of the power.

An aspect of the present disclosure is a system including: a measuring device that acquires information relating to a fluctuation of power consumed by an electrical product operated around a user; and a server that executes obtaining the information relating to the fluctuation of the power from the measuring device, and estimating a product consumed by the user and a consumption quantity of the product based on the information relating to the fluctuation of the power.

Another aspect of the present disclosure provides a program that causes a computer to execute the above-described information processing method, or a computer-readable storage medium that non-temporarily stores the program.

According to the present disclosure, the consumption quantity of the product can be estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device that is one of the aspects of the present disclosure includes a control unit. The control unit acquires information relating to a fluctuation of power consumed by an electrical product operating around a user, and estimates the product consumed by the user and a consumption quantity of the product based on the information relating to the fluctuation in the power. An electrical product that operates around a user is a product in which an operating state changes based on a state of air around the user such as an air conditioner or an air purifier. As an operating state of electrical product changes, the power consumed by electrical product changes. Therefore, the fluctuation in the power consumed by the electrical product correlate with the state of the air around the user. Since the state of the air around the user is a state corresponding to the consumption of the product, the fluctuation of the power consumed by the electric product is peculiar to the product.

For example, if the user smokes, the power consumption of the air purifier increases. The fluctuation of the power consumption of this air purifier is a fluctuation in accordance with someone smoking a cigarette, and for example, the maximum value of the fluctuation amount of the power consumption, the duration of the fluctuation of the power consumption, or the value of the power consumption per unit time (the fluctuation amount may be a value obtained by integrating the fluctuation amount per hour), etc. has a correlation with the consumption of cigarettes. Thus, it can be estimated that one cigarette is consumed, based on the maximum value of the fluctuation amount of the power consumption of the air purifier, the duration of the fluctuation of the power consumption, or the value obtained by integrating the fluctuation amount of the power consumption per unit time.

The fluctuation amount of the power consumption may be the fluctuation amount from the power consumption of the electrical product when the user is not consuming the product. Hereinafter, the reference value of the power consumption of the electrical product when the user is not consuming the product is also referred to as the reference power, and the fluctuation amount of the power consumption is referred to as the fluctuation amount from the reference power. The reference power may be the power consumption when the electrical product is in an idle state.

Also, for example, when cooking by using a cassette stove, the temperature of the room rises. As a result, the air conditioner tries to lower the temperature of the room and the power consumption fluctuates. The fluctuation of the power consumption at this time corresponds to the rise in the temperature of the room and correlates with the amount of gas consumed. Thus, based on the maximum value of the fluctuation amount of the power consumption of the air conditioner, the duration of the fluctuation of the power consumption, or the value obtained by integrating the fluctuation amount per unit time, it can be estimated that gas has been consumed, and the consumption quantity of gas can also be estimated.

In this way, since there is a correlation between the consumed product and the fluctuation of the power consumed by the electrical product, the product consumed by the user and the consumption quantity of the product can be estimated based on the information relating to the fluctuation of the consumed power. The electrical product operating around the user may be a product in which feedback control is performed based on a physical quantity related to the state of air.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

Figure 1:
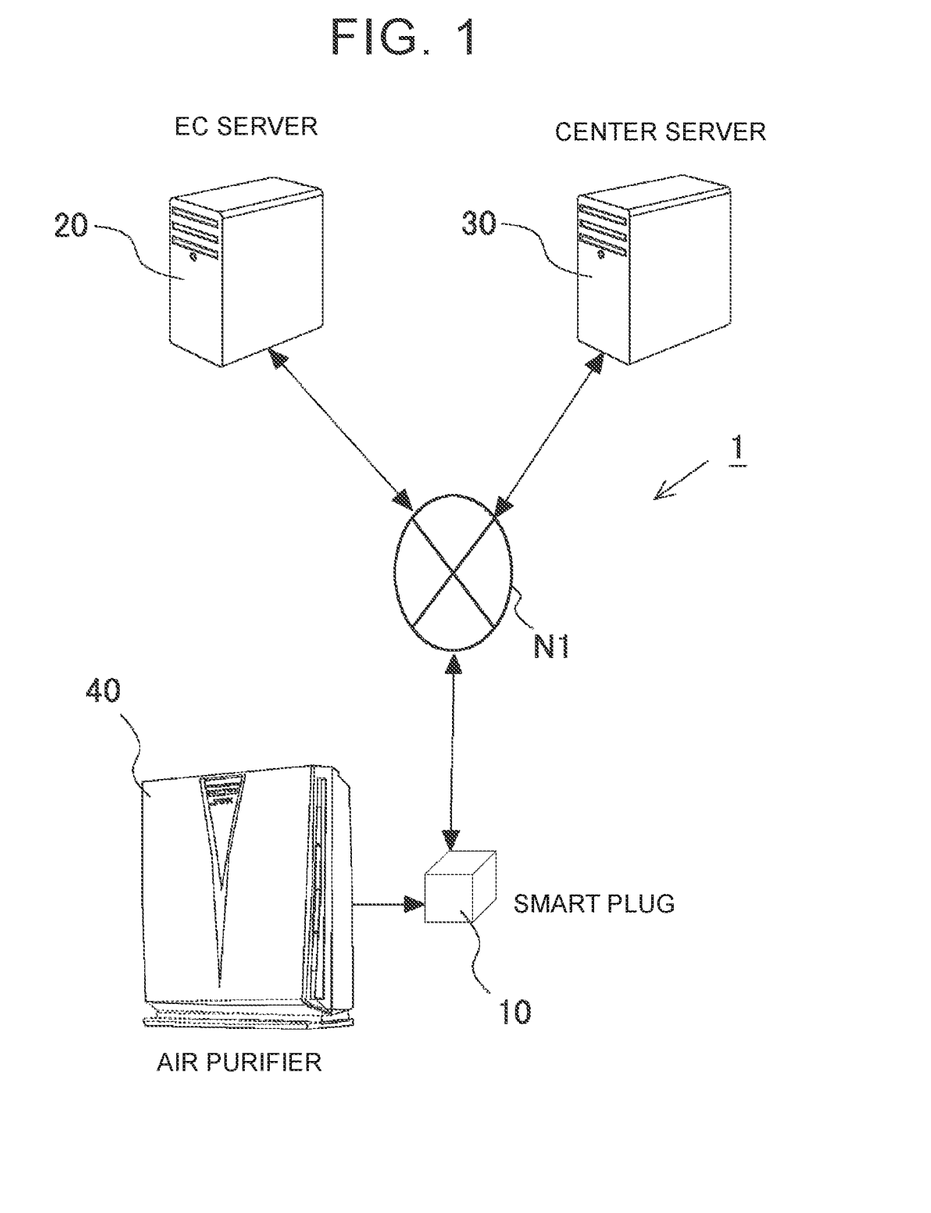
FIG. 1 is a diagram showing a schematic configuration of a system according to a first embodiment.

FIG. 1 is a diagram showing a schematic configuration of a system 1 according to a first embodiment. The system 1 includes a smart plug 10, an EC server 20, a center server 30, and an air purifier 40. The smart plug 10, the EC server 20, and the center server 30 are connected to each other by a network N1. The smart plug 10 has a plug inserted into an outlet provided in the user's house and an outlet into which a plug provided in the air purifier 40 is inserted. Power is supplied to the air purifier 40 via the smart plug 10. The smart plug 10 measures the power supplied to the air purifier 40, that is, the power consumed by the air purifier 40. The air purifier 40 is an example of an electrical product that operates around the user.

The network N1 is, for example, a world-wide public communication network such as the Internet, and a wide area network (WAN) or other communication networks may be adopted. In addition, the network N1 may include a telephone communication network such as a mobile phone network or a wireless communication network such as Wi-Fi (registered trademark). Note that FIG. 1 illustrates one smart plug 10, one EC server 20, and one center server 30 by way of example. However, there may be a plurality of the above.

Figure 2:
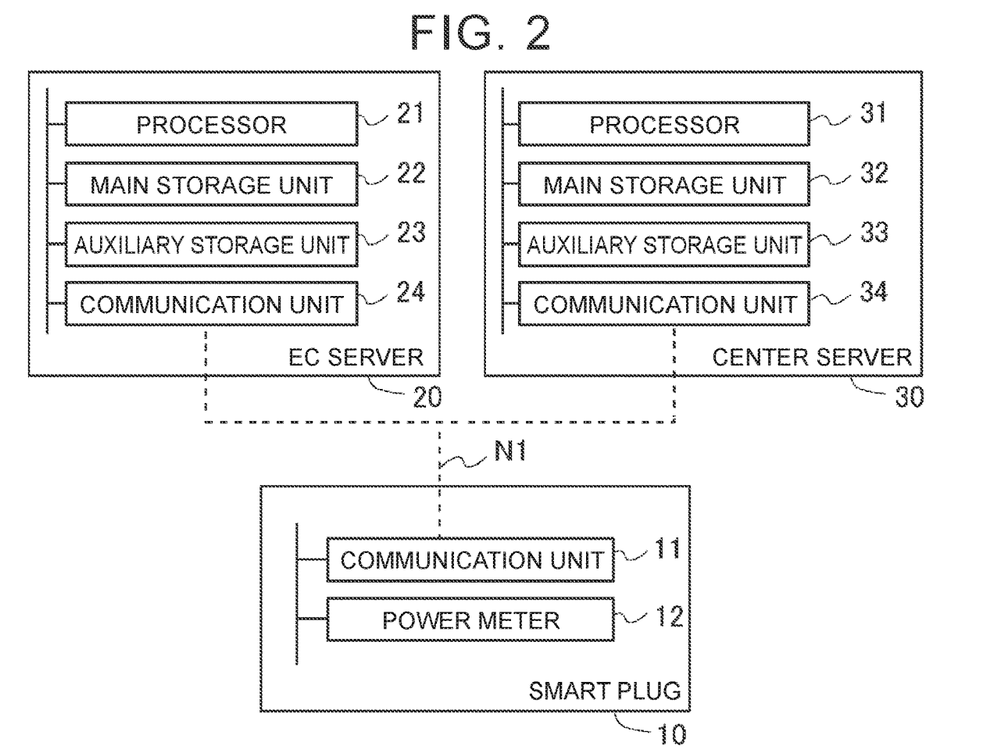
FIG. 2 is a block diagram schematically showing an example of the configuration of a smart plug, an EC server, and a center server constituting the system according to the embodiment.

Hardware configurations of the smart plug 10, the EC server 20, and the center server 30 will be described with reference to FIG. 2. As the air purifier 40, an air purifier having a conventional configuration can be used. The air purifier 40 detects the degree of contamination of the surrounding air with a sensor, and controls the rotation speed of the fan according to the degree of contamination. That is, the greater the degree of air pollution, the higher the rotation speed of the fan, and the more air pollution is removed per unit time. FIG. 2 is a block diagram schematically showing an example of the configurations of the smart plug 10, the EC server 20, and the center server 30 configuring the system 1 according to the present embodiment.

The center server 30 has a general computer configuration. The center server 30 includes a processor 31, a main storage unit 32, an auxiliary storage unit 33, and a communication unit 34. The components above are connected to each other by a bus. The processor 31 is an example of a control unit.

The processor 31 is a central processing unit (CPU), a digital signal processor (DSP), or the like. The processor 31 controls the center server 30 and performs various information processing calculations. The main storage unit 32 is a random access memory (RAM), a read-only memory (ROM), or the like. The auxiliary storage unit 33 is an erasable programmable ROM (EPROM), a hard disk drive (HDD), a removable medium, or the like. The auxiliary storage unit 33 stores an operating system (OS), various kinds of programs, various kinds of tables, and the like. The processor 31 loads the program stored in the auxiliary storage unit 33 into the work area of the main storage unit 32 and executes the program. Through execution of the program, each component is controlled. As a result, the center server 30 realizes the function that matches the predetermined purpose. The main storage unit 32 and the auxiliary storage unit 33 are computer-readable recording media. The center server 30 may be a single computer or may include a plurality of computers linked together. Further, the information stored in the auxiliary storage unit 33 may be stored in the main storage unit 32. Further, the information stored in the main storage unit 32 may be stored in the auxiliary storage unit 33. In the auxiliary storage unit 33, for example, information relating to the number of each product owned by the user is stored.

The communication unit 34 is a means for communicating with the smart plug 10 and the EC server 20 via the network N1. The communication unit 34 is, for example, a local area network (LAN) interface board or a wireless communication circuit for wireless communication. The LAN interface board and the wireless communication circuit are connected to the network N1.

The EC server 20 is a computer that conducts electronic commerce, and at least trades products with the center server 30. The EC server 20 executes a process of receiving an order for a product from the center server 30, and executes a process of providing the ordered product to the user. The EC server 20 executes a process of notifying, for example, a distribution center, of a name of the product to be delivered and a delivery destination. Existing means such as a home delivery service can be used for actual delivery. Therefore, the description thereof will be omitted. The EC server 20 includes a processor 21, a main storage unit 22, an auxiliary storage unit 23, and a communication unit 24. Since the processor 21, the main storage unit 22, the auxiliary storage unit 23, and the communication unit 24 of the EC server 20 are the same as the processor 31, the main storage unit 32, the auxiliary storage unit 33, and the communication unit 34 of the center server 30, description thereof will be omitted.

Next, the smart plug 10 measures the power consumption of the air purifier 40 connected to the smart plug 10 and transmits the power consumption to the center server 30. In general, since the voltage is constant in a household outlet, the current may be measured and transmitted to the center server 30. The smart plug 10 has a communication unit 11 and a power meter 12. The components above are connected to each other by a bus. The power meter 12 is an example of a measuring device.

The communication unit 11 is a communication means for connecting the smart plug 10 to the network N1. The communication unit 11 is a circuit for communicating with other devices (for example, the center server 30) via the network N1 using wireless communication such as a mobile communication service (for example, a telephone communication network such as the fifth generation (5G), the fourth generation (4G), the third generation (3G), and long term evolution (LTE)), Wi-Fi (registered trademark), Bluetooth (registered trademark), or radio frequency identification (RFID). The power meter 12 is a sensor that outputs a signal according to the power consumption of the air purifier 40. The smart plug 10 transmits the power consumption to the center server 30 via the communication unit 11 at predetermined time intervals. An ammeter may be provided instead of the power meter 12, and the current value may be transmitted to the center server 30.

Figure 3:
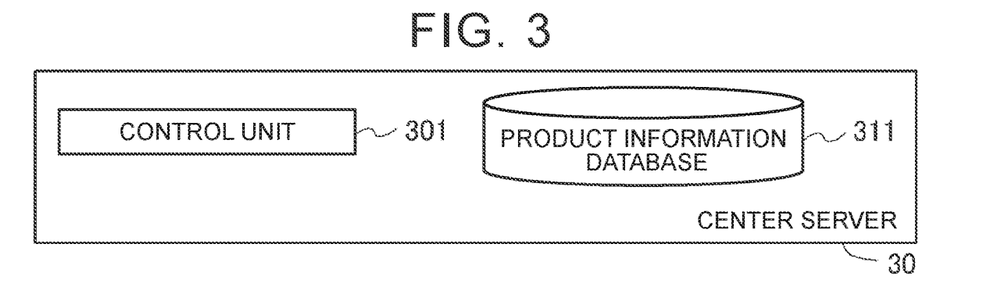
FIG. 3 is a diagram showing an example of a functional configuration of the center server.

Next, the function of the center server 30 will be described. FIG. 3 is a diagram showing an example of a functional configuration of the center server 30. The center server 30 includes a control unit 301 and a product information database (DB) 311 as functional components. The processor 31 of the center server 30 executes the process of the control unit 301 using a computer program stored in the main storage unit 32. However, a part of the control unit 301 may be executed by a hardware circuit.

The product information DB 311 is constructed in a manner such that a program of a database management system (DBMS) executed by the processor 31 manages data stored in the auxiliary storage unit 33. The product information DB 311 is, for example, a relational database.

By providing the smart plug 10 or the EC server 20 with a function of the center server 30, the center server 30 can be omitted.

The control unit 301 estimates the consumed product and the consumption quantity of the product based on the information relating to the power consumption of the air purifier 40 received from the smart plug 10. The product estimated to be consumed may be limited to a product registered by the user in advance, or may be limited to a product that can be ordered by the center server 30. For example, the control unit 301 collates the information relating to the fluctuation of the power consumption received from the smart plug 10 with the information relating to the fluctuation of the power consumption corresponding to each product stored in the product information DB 311 and searches for a matching product. Then, when there is a product having the same fluctuation of power consumption, it is estimated that the product has been consumed. When the control unit 301 estimates the consumed product, the control unit 301 adds 1 to the consumption counter. The consumption counter is a counter that counts the number of times the product is consumed. The consumption counter is set for each product.

As described above, the control unit 301 counts the number of times the product is consumed. When the consumption counter reaches or exceeds a predetermined value, the control unit 301 orders the product with the EC server 20. The predetermined value may be set based on the remaining quantity of the product. For example, the predetermined value may be set such that the product arrives before the remaining quantity of the product becomes zero. Further, for example, the product may be ordered when the remaining quantity of the product is equal to or less than a lower limit value. When placing an order based on the remaining quantity of the product, for example, the user registers an initial value of the remaining quantity of consumption in the center server 30 using a terminal. The number of products to be ordered at this time may be, for example, the same as the number indicated by the consumption counter. Therefore, the predetermined value of the consumption counter may be set to an integral multiple of the sales unit of the product. For example, when a user consumes cigarettes, the user may order an integral multiple of a predetermined number of cigarettes in a box.

When the product is ordered, the control unit 301 transmits, to the EC server 20, information relating to the product, information relating to an order quantity, and information relating to a shipping address. The information relating to the product to be transmitted to the EC server 20 is information that can identify the product, for example, a product name or a product identification (ID). The information relating to the order quantity to be transmitted to the EC server 20 is information relating to the quantity of the product to be ordered at one time. The order quantity may be set by the user, or the consumption quantity of the product may be set as the order quantity. The information relating to the shipping address to be transmitted to the EC server 20 is information required for delivering the product to the user. The information relating to the shipping address includes, for example, information relating to the address, name, and telephone number of the user. The user registers the information relating to the shipping address in the center server 30.

Figure 4:
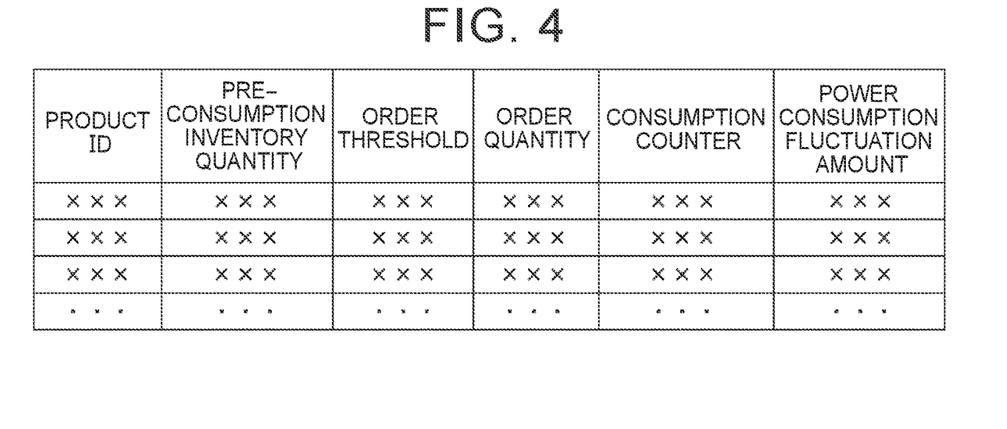
FIG. 4 is a diagram illustrating a configuration of a product information table stored in a product information database (DB)

The control unit 301 stores the initial value of the remaining quantity of the product, the consumption counter, and the like in the product information DB 311. FIG. 4 is a diagram illustrating the configuration of a product information table stored in the product information DB 311. The product information DB 311 is generated for each user. The product information table includes fields of product ID, pre-consumption inventory quantity, order threshold, order quantity, consumption counter, and the power consumption fluctuation amount. The product ID field is a field in which identification information (product ID) corresponding to each product is input. The product ID may be assigned by the control unit 301. The pre-consumption inventory quantity field is a field in which the remaining quantity of the product before the user consumes the product is input. The initial value of the pre-consumption inventory quantity is input by the user, for example, via a terminal. The order threshold field is a field in which the remaining quantity of the product is input. The remaining quantity of the product serves as a threshold (order threshold) for ordering the product by the control unit 301. The order threshold may be set by the user, or may be set by the control unit 301.

The order quantity field is a field in which the quantity (order quantity) of the product to be ordered at one time is input. The order quantity may also be set by the user, or may be set by the control unit 301. Further, the order quantity may be the same as the number indicated by the consumption counter. The consumption counter field is a field in which the numerical value of the consumption counter is input. The control unit 301 updates the consumption counter field based on the fluctuation of the power consumption transmitted from the smart plug 10.

The power consumption fluctuation amount field is a field in which information relating to fluctuations in the power consumption of the air purifier 40 when the product is consumed is input. information relating to a place where information relating to the fluctuation of the power consumption of the air purifier 40 when the product is consumed may be stored may be input in the power consumption fluctuation amount field. information relating to the power consumption fluctuation is learned in advance and stored in the auxiliary storage unit 33. For example, the fluctuation of the power when each product is consumed may be obtained in advance by an experiment, a simulation, or the like. The information relating to the fluctuation of the power consumption is, for example, the maximum value of the fluctuation amount of the power consumption of the corresponding air purifier 40 when the product is consumed from a reference power, an integrated value of the fluctuation amount from the reference power, or a duration time in which the fluctuation amount from the reference power is equal to or more than a predetermined amount. The predetermined amount referred to here is, for example, a value at which it can be determined that the power consumption has changed from the reference power. These correlate with the power consumption required to remove air pollution or odor associated with the consumption of products. Since the information relating to the fluctuation of the power consumption differs for each product, the information is learned in advance for each product and is stored in the auxiliary storage unit 33.

For example, when someone smokes a cigarette, the air purifier 40 tries to remove air pollution and increases the rotation speed of the fan motor. At this time, the power consumption of the air purifier 40 increases. For example, the maximum value of the fluctuation amount of the power consumption of the air purifier 40 when someone smokes one cigarette from the reference power, the integrated value of the fluctuation amount from the reference power, or the duration time in which the fluctuation amount from the reference power is equal to or more than the predetermined amount becomes a unique value of when someone smokes one cigarette. Thus, if these relationships are learned in advance and the data is stored in the auxiliary storage unit 33, the consumption of cigarettes and the consumption quantity of cigarettes can be estimated based on the power consumption of the air purifier 40.

The control unit 301 calculates a value obtained by subtracting the order threshold from the pre-consumption inventory quantity as the consumption quantity with which an order placement for the product is required. When the consumption counter reaches or exceeds the consumption quantity with which the order placement is required, the order is placed with the EC server 20 in accordance with the order quantity. At this time, the control unit 301 transmits, to the EC server 20, the product ID, the order quantity, and the shipping address. When the order placement is completed, the control unit 301 updates the pre-consumption inventory quantity by inputting the total value obtained by adding the value of the consumption counter to the order threshold to the pre-consumption inventory quantity. After that, the control unit 301 resets the consumption counter.

Figure 5:
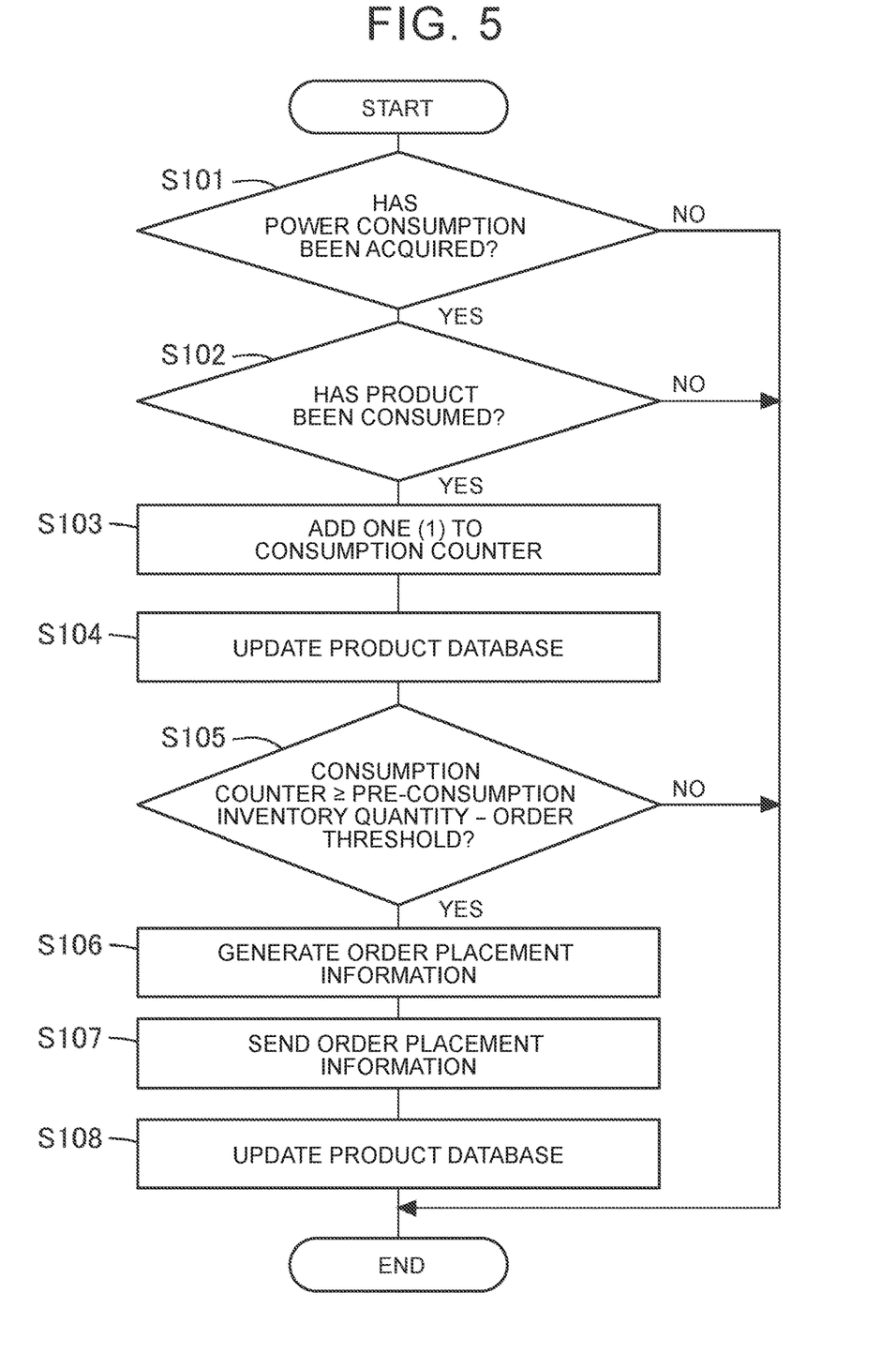
FIG. 5 is a flowchart showing a flow of the process of ordering the product by a center server.

Next, the process of ordering the product by the center server 30 will be described. FIG. 5 is a flowchart showing a flow of the process of ordering the product by the center server 30. The flowchart shown in FIG. 5 is executed by the center server 30 at predetermined time intervals. The description will be made on assumption that, in the product information table, necessary information is already stored in each of the product ID field, the pre-consumption inventory quantity field, the order threshold field, the order quantity field, and the power consumption fluctuation amount. Further, the description will also be made on assumption that the shipping address of the product is stored in the auxiliary storage unit 33 of the center server 30.

In step S101, the control unit 301 determines whether the power consumption has been received. When the power consumption of the air purifier 40 changes from the reference power, the smart plug 10 may transmit information relating to the power consumption to the center server 30. In this case, when the control unit 301 receives the power consumption, the power consumption of the air purifier 40 is increased. Alternatively, the smart plug 10 may periodically transmit the power consumption of the air purifier 40. At this time, the transition of the power consumption from the time of the previous transmission of the power consumption to the time of the current transmission may be transmitted, or an instantaneous value of the power consumption at the time of transmission may be transmitted. In any case, the smart plug 10 transmits the power consumption at intervals at which it can be determined that the product has been consumed based on the power consumption of the air purifier 40. The smart plug 10 transmits the power consumption to the center server 30 by associating the power consumption with the identification information of the smart plug 10. In the center server 30, the identification information of the smart plug 10 and the relationship with the user are registered in advance by the user, and this relationship is stored in the auxiliary storage unit 33. When an affirmative determination is made in step S101, the process proceeds to step S102, and when a negative determination is made, the routine is terminated.

In step S102, the control unit 301 determines whether the fluctuation amount of the power consumption corresponds to the fluctuation amount of the power consumption when the product is consumed. For example, the control unit 301 collates the maximum value of the fluctuation amount of the power consumption received from the smart plug 10 with the maximum value of the fluctuation amount of the power consumption corresponding to each product stored in the product information DB 311 and finds a match. Then, when there is a product having the same maximum value of the fluctuation amount of the power consumption, it is determined that the product has been consumed. When an affirmative determination is made in step S102, the process proceeds to step S103, and when a negative determination is made, the routine is terminated. When the power consumption is on the rise, it is difficult to estimate the consumed product since the maximum value of the fluctuation amount of the power consumption is not yet known. Thus, in step S102, it may be determined whether the product has been consumed only when the power consumption tends to decrease.

In step S103, the control unit 301 counts up the consumption counter by adding 1 to the consumption counter. With the process above, the number of times the product is consumed, that is, the consumption quantity of the product, is counted. In step S104, the control unit 301 updates the product information DB 311 by storing the consumption counter calculated in step S103 in the product information DB 311.

In step S105, the control unit 301 determines whether the consumption counter is equal to or greater than the value obtained by subtracting the order threshold from the pre-consumption inventory quantity. That is, the control unit 301 determines whether the consumption quantity of the product corresponding to the power consumption acquired in step S101 has reached the number of times at which the order placement for the product is required. When an affirmative determination is made in step S105, the process proceeds to step S106, and when a negative determination is made, the routine is terminated.

In step S106, the control unit 301 generates order placement information. The order placement information is information required for delivering the product to the user, and is information transmitted by the control unit 301 to the EC server 20. The order placement information includes information relating to the product ID, the order quantity of the product, and the information relating to the shipping address of the product. The control unit 301 generates the order placement information based on the information stored in the auxiliary storage unit 33. In step S107, the control unit 301 transmits the order placement information to the center server 30. Subsequently, in step S108, the control unit 301 updates the product information DB 311. At this time, the control unit 301 resets the consumption counter, and further, inputs the total value obtained by adding the value of consumption counter to the order threshold to the pre-consumption inventory quantity.

As described above, according to the present embodiment, the center server 30 acquires the power consumption of the air purifier 40 detected by the smart plug 10, estimates the consumed product based on the power consumption, and also estimates the consumption quantity of the product. Furthermore, the product is ordered in accordance with the consumption quantity of the product. Therefore, the user can replenish the product at an appropriate time without management of the inventory of the product by the user.

Second Embodiment

Figure 6:
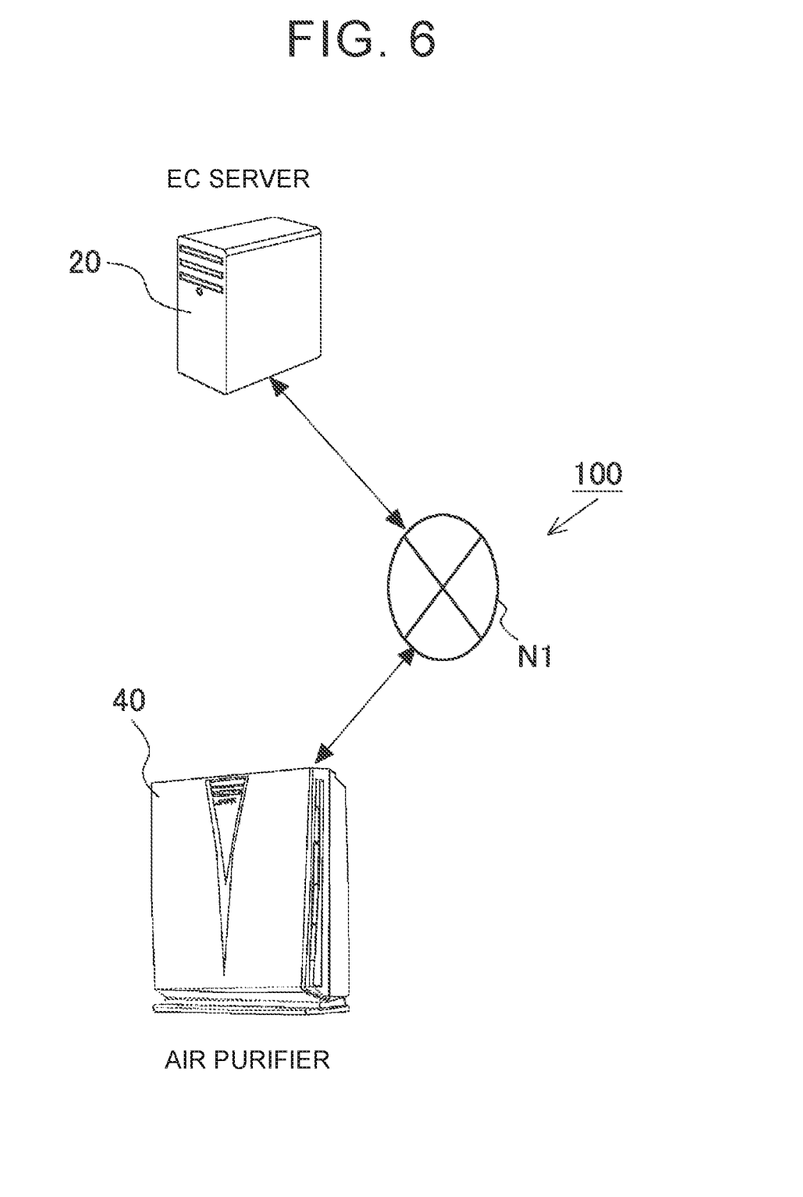
FIG. 6 is a diagram showing a schematic configuration of a system according to a second embodiment.

FIG. 6 is a diagram showing a schematic configuration of a system 100 according to the present embodiment. A system 100 is a system in which the air purifier 40 estimates the consumption quantity of the product based on the power consumption, and that places an order for the product to the EC server 20 when the consumption quantity of the product exceeds a predetermined value.

In the example of FIG. 6, the system 100 includes the EC server 20 and the air purifier 40. The EC server 20 and the air purifier 40 are connected to each other by the network N1.

Figure 7:
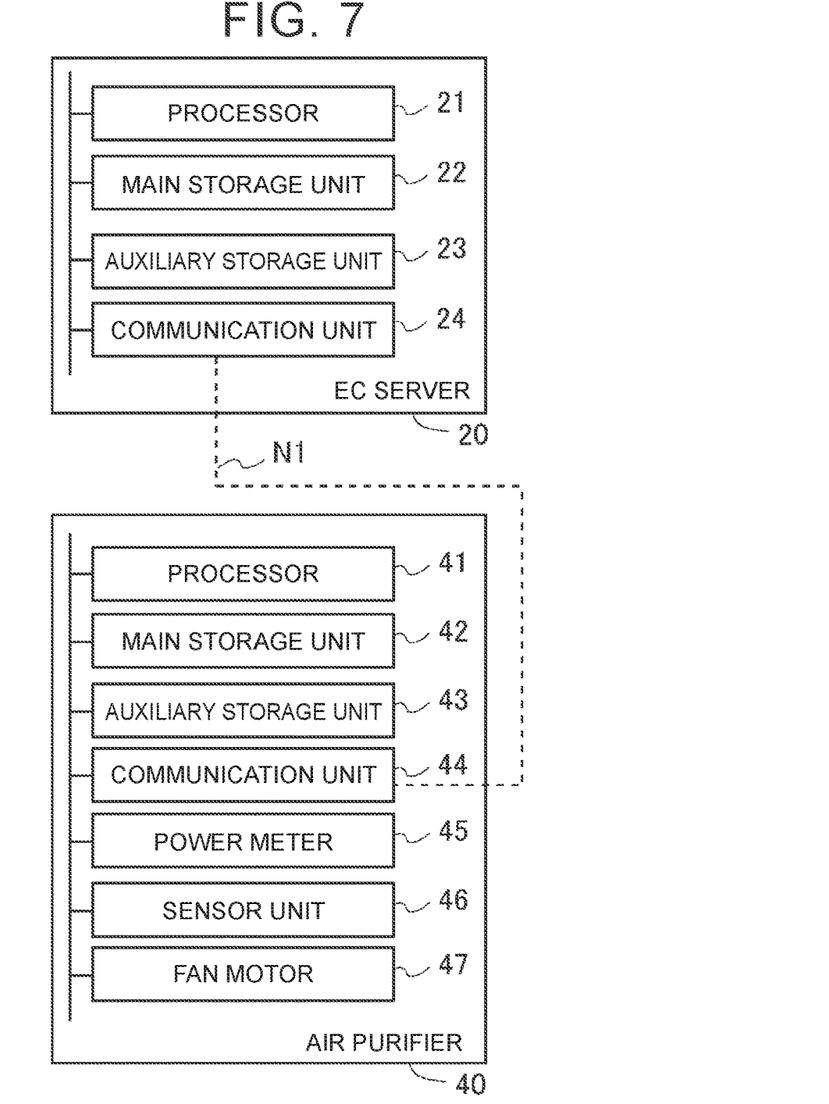
FIG. 7 is a block diagram schematically showing an example of respective configurations of an air purifier and an EC server configuring the system according to the second embodiment.

The hardware configuration of the air purifier 40 will be described. Since the hardware and functions of the EC server 20 are the same as those in the first embodiment, the air purifier 40 will be mainly described in the present embodiment. FIG. 7 is a block diagram schematically showing an example of each configuration of the air purifier 40 and the EC server 20 constituting the system 100 according to the second embodiment. The air purifier 40 includes a processor 41, a main storage unit 42, an auxiliary storage unit 43, a communication unit 44, a power meter 45, a sensor unit 46, and a fan motor 47. The components above are connected to each other by a bus. The processor 41, the main storage unit 42, and the auxiliary storage unit 43 of the air purifier 40 are the same as the processor 31, the main storage unit 32, and the auxiliary storage unit 33 of the center server 30 described in the first embodiment. Thus, description thereof will be omitted. The processor 41 is an example of a control unit. Further, since the communication unit 44 and the power meter 45 of the air purifier 40 are the same as the communication unit 11 and the power meter 12 described in the first embodiment, description thereof will be omitted.

The sensor unit 46 is a sensor that detects air pollution or odor. The sensor unit 46 includes, for example, an element in which an electrical resistance changes according to the intensity of the odor. The fan motor 47 is a motor that rotates the fan of the air purifier.

Figure 8:
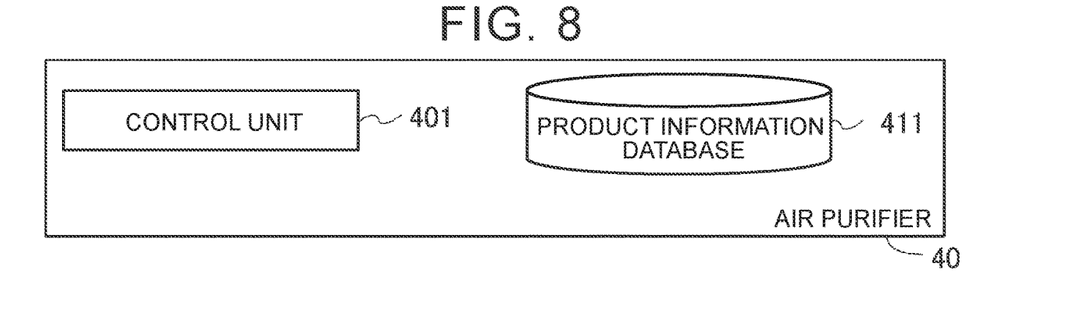
FIG. 8 is a diagram illustrating a functional configuration of an air purifier.

Next, the function of the air purifier 40 will be described. FIG. 8 is a diagram illustrating the functional configuration of the air purifier 40. The air purifier 40 includes a control unit 401 and a product information DB 411 as functional components. The processor 41 of the air purifier 40 executes the process of the control unit 401 using a computer program stored in the main storage unit 42. However, a part of the control unit 401 may be executed by a hardware circuit.

The product information DB 411 is constructed in a manner such that a program of a database management system (DBMS) executed by the processor 41 manages data stored in the auxiliary storage unit 43. The product information DB 411 is, for example, a relational database.

The control unit 401 feedback-controls the rotation speed of the fan motor 47 in accordance with the contamination or odor of the air detected by the sensor unit 46. A known technique can be used for this control.

Further, the control unit 401 estimates the consumption of the product based on the power consumption of the air purifier 40 measured by the power meter 45, and adds 1 to the consumption counter when the consumption of the product is estimated. As described above, the control unit 401 counts the number of times the product is consumed. When the consumption counter reaches or exceeds a predetermined value, the control unit 401 orders the product with the EC server 20. The predetermined value of the consumption counter may be set based on the remaining quantity of the product. For example, the predetermined value may be set such that the product arrives before the remaining quantity of the product becomes zero. In this case, for example, the user may register the initial value of the remaining quantity of the product in the air purifier 40 by using a terminal, or an interface for inputting the initial value of the remaining quantity of the product in the air purifier 40 may be provided. The same information as the product information DB 311 of the first embodiment is input to the product information DB 411. The information stored in the power consumption fluctuation amount field may be stored in the auxiliary storage unit 43 in advance, or may be downloaded from the EC server 20.

The control unit 401 calculates a value obtained by subtracting the order threshold from the pre-consumption inventory quantity as the number of times the product is consumed in which an order placement for the product is required. When the consumption counter reaches or exceeds the number of times the product is consumed with which the order placement is required, the order is placed with the EC server 20 in accordance with the order quantity. At this time, the control unit 401 transmits, to the EC server 20, the product ID, the order quantity, and the shipping address. The shipping address is stored in the air purifier 40 in advance by the user. When the order placement is completed, the control unit 401 updates the pre-consumption inventory quantity by inputting the total value obtained by adding the value of the consumption counter to the order threshold to the pre-consumption inventory quantity. The control unit 401 resets the consumption counter.

Figure 9:
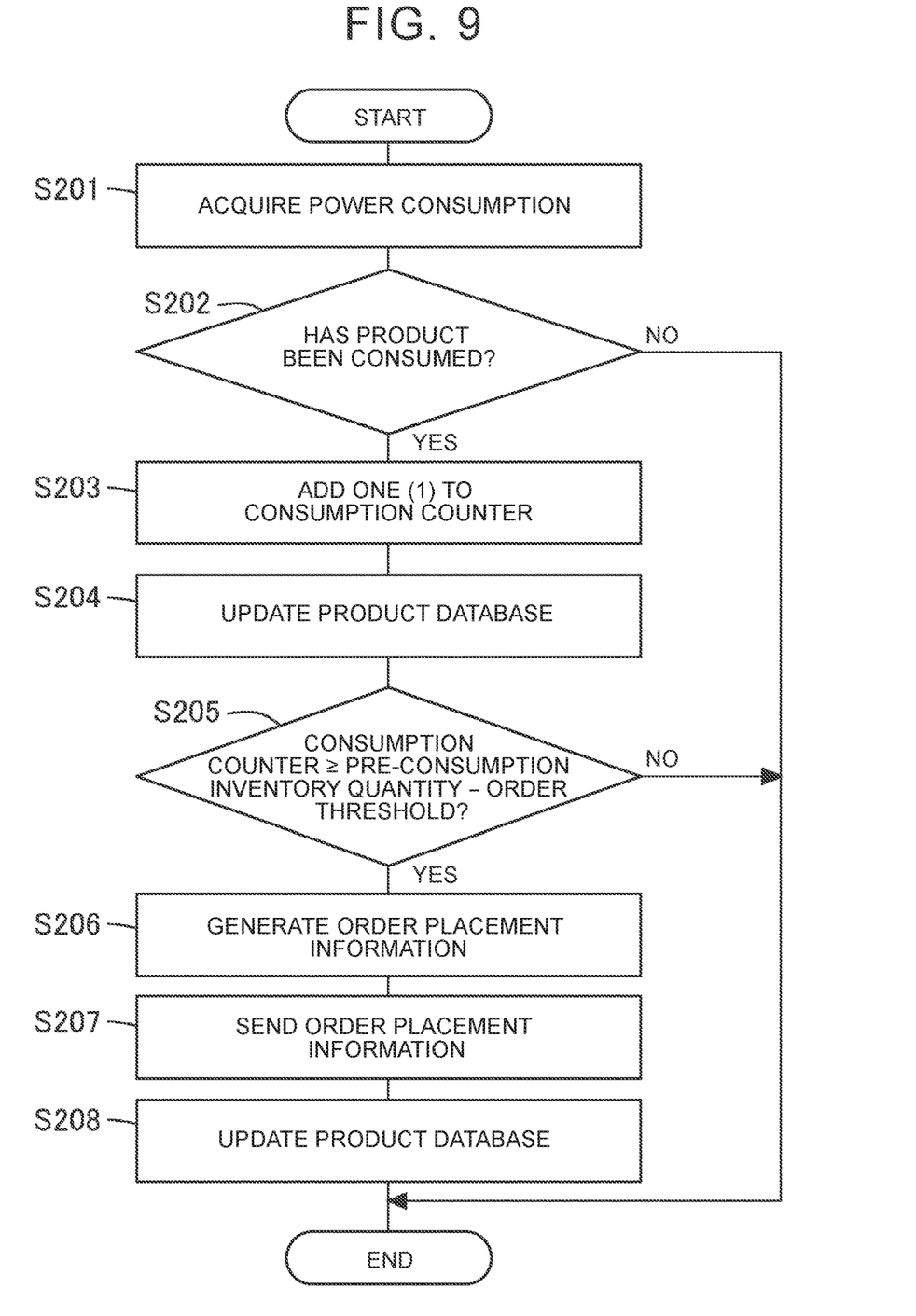
FIG. 9 is a flowchart showing a flow of the process of ordering the product by the air purifier.

Next, the process of ordering the product by the air purifier 40 will be described. FIG. 9 is a flowchart showing a flow of the process of ordering the product by the air purifier 40. The flowchart shown in FIG. 9 is executed by the air purifier 40 at predetermined time intervals. The description will be made on assumption that, in the product information table, necessary information is already stored in each of the product ID field, the pre-consumption inventory quantity field, the order threshold field, the order quantity field, and the power consumption fluctuation amount. Further, the description will also be made on assumption that the shipping address of the product is stored in the auxiliary storage unit 43 of the air purifier 40.

In step S201, the control unit 401 acquires the power consumption from the power meter 45. In step S202, the control unit 401 determines whether the product has been consumed. The maximum value of the fluctuation amount is extracted from the power consumption acquired in step S201, and this maximum value is compared with the maximum value of the fluctuation amount of the power consumption stored in the power consumption fluctuation amount field of the product information DB 411, and the product that has the same maximum value of the fluctuation amount of the power consumption is searched. As a result, it is determined whether the product has been consumed. When an affirmative determination is made in step S202, the process proceeds to step S203, and when a negative determination is made, the routine is terminated.

In step S203, the control unit 401 counts up the consumption counter by adding 1 to the consumption counter. With the process above, the number of times the product is consumed, that is, the consumption quantity of the product, is counted. In step S204, the control unit 401 updates the product information DB 411 by storing the consumption counter calculated in step S203 in the product information DB 411.

In step S205, the control unit 401 determines whether the consumption counter is equal to or greater than the value obtained by subtracting the order threshold from the pre-consumption inventory quantity. That is, the control unit 401 determines whether the consumption quantity of the product corresponding to the power consumption acquired in step S201 has reached the number of times at which the order placement for the product is required. When an affirmative determination is made in step S205, the process proceeds to step S206, and when a negative determination is made, the routine is terminated.

In step S206, the control unit 401 generates order placement information. The order placement information is information required for delivering the product to the user, and is information transmitted by the control unit 401 to the EC server 20. The order placement information includes information relating to the product ID, the order quantity of the product, and the information relating to the shipping address of the product. The control unit 401 generates the order placement information based on the information stored in the auxiliary storage unit 43. In step S207, the control unit 401 transmits the order placement information to the center server 30.

Subsequently, in step S208, the control unit 401 updates the product information DB 411. At this time, the control unit 401 resets the consumption counter, and further, inputs the total value obtained by adding the value of consumption counter to the order threshold to the pre-consumption inventory quantity.

As described above, according to the present embodiment, the consumption quantity of the product can be estimated based on the power consumption of the air purifier 40, and the product can be ordered according to the consumption quantity of the product. Therefore, the user can replenish the product at an appropriate time without management of the inventory of the product by the user.

OTHER EMBODIMENTS

The above-described embodiment is merely an example, and the present disclosure may be appropriately modified and implemented without departing from the scope thereof.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. For example, a part or all of the functions of the center server 30 may be provided in the smart plug 10 or the EC server 20. Further, for example, a part or all of the functions of the smart plug 10 may be provided in the air purifier 40. Further, in the above embodiment, the consumed product is estimated and the consumption quantity of the product is estimated based on the power consumption of the air purifier 40. However, not limited to the air purifier 40, the consumed product and the consumption quantity of the product may be estimated based on the power consumption of other electric products in which the power consumption changes according to the state of the air. For example, the consumed products can be estimated based on the power consumption of the air conditioner. For example, when a gas stove that uses a gas cylinder is used, the temperature of the room rises according to the consumption of gas. Thus, in the air conditioner, the rotation speed of the motor that rotates the fan and the motor that rotates the pump in order to lower the temperature of the room is increased. This increases power consumption. The fluctuation amount in power consumption at this time correlates with the consumption of the gas filled in the gas cylinder. Therefore, it is possible to estimate the consumption of gas and estimate the gas consumption quantity based on the fluctuation amount of the power consumption of the air conditioner from the reference power.

Further, in the above embodiment, the number of times the product is consumed is counted as the consumption quantity of the product. However, there are some products that cannot be consumed in one time of usage. For example, in the case of the above gas cylinder, not all the gas in the gas cylinder is consumed in one use. Thus, for example, the gas consumption quantity may be estimated based on the time during which the gas is used. That is, when the use of gas is estimated, the consumption quantity of gas may be estimated based on the duration thereof. Then, the control unit 301 orders the gas when the consumption quantity of the gas exceeds a predetermined amount.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands

What is claimed is:

1. A non-transitory computer readable medium having a program imbedded therein, the program, when executed by a computer, causing the computer to execute:
   communicating with an electrical product operated around a user via a network, the electrical product being a product in which feedback control is performed based on an air quality around the user;
   acquiring information relating to a fluctuation of power consumed by the electrical product;
   determining a product consumed by the user and a consumed amount of the product based on the information relating to the fluctuation of the power, the fluctuation of the power correlating with the air quality around the user, the air quality correlating with the product consumed by the user and the consumed amount of the product;
   calculating a remaining amount of the product based on the determined consumed amount of the product; and
   ordering the product when the calculated remaining amount of the product is equal to or less than a threshold at which the product is ordered.

2. The non-transitory computer readable medium according to claim 1, the program causing the computer to execute acquiring a fluctuation amount from power consumed when the electrical product is in an idle state as the information relating to the fluctuation of the power.

3. The non-transitory computer readable medium according to claim 1, the program causing the computer to execute determining the product consumed by the user by collating the information relating to the fluctuation of the power with stored data.

4. The non-transitory computer readable medium according to claim 1, the program causing the computer to execute determining the product consumed by the user based on a maximum value of a fluctuation amount of a power consumption of the electrical product from power consumed when the electrical product is in an idle state.

5. The non-transitory computer readable medium according to claim 1, the program causing the computer to execute determining the product consumed by the user based on the information relating to the fluctuation of the power and a relationship between the information relating to the fluctuation of the power and the product consumed by the user, the relationship being stored in a storage unit.

6. The non-transitory computer readable medium according to claim 1, the program causing the computer to execute determining the consumed amount of the product based on the number of times the user is estimated to have consumed the product.

* * * * *